(12) United States Patent
Yeh

(10) Patent No.: US 8,943,264 B2
(45) Date of Patent: Jan. 27, 2015

(54) DATA STORING METHOD, AND MEMORY CONTROLLER AND MEMORY STORAGE APPARATUS USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 382 days.

(21) Appl. No.: 13/587,923

(22) Filed: Aug. 17, 2012

(65) Prior Publication Data

US 2012/0317346 A1    Dec. 13, 2012

Related U.S. Application Data

(63) Continuation-in-part of application No. 12/649,739, filed on Dec. 30, 2009.

(30) Foreign Application Priority Data

Nov. 23, 2009  (TW) ............................. 98139810 A
Jun. 7, 2012   (TW) ............................. 101120517 A

(51) Int. Cl.
*G06F 12/00*   (2006.01)
*G06F 12/02*   (2006.01)

(52) U.S. Cl.
CPC .... *G06F 12/0246* (2013.01); *G06F 2212/7202* (2013.01)
USPC .......................................... 711/103; 711/104

(58) Field of Classification Search
USPC ................................................ 711/103, 104
See application file for complete search history.

(56) References Cited

U.S. PATENT DOCUMENTS

| 7,136,986 B2 | 11/2006 | Han et al. |
| 2004/0111583 A1 | 6/2004 | Han et al. |
| 2010/0017561 A1 | 1/2010 | Yang et al. |
| 2010/0153624 A1 | 6/2010 | Kuo |

FOREIGN PATENT DOCUMENTS

TW             201118569             6/2011

OTHER PUBLICATIONS

"Office Action of U.S. counterpart application" issued on Feb. 29, 2012, p.1-p.9, in which the listed references (US 20040111583, US 7136986 and US 20100017561) were cited.
"Office Action of U.S. counterpart application" issued on Jul. 30, 2012, p.1-p.11, in which the listed reference (US 20100153624) was cited.
"Office Action of Taiwan Counterpart Application", issued on Jun. 6, 2014, p.1-p.7.

*Primary Examiner* — Mardochee Chery
(74) *Attorney, Agent, or Firm* — Jianq Chyun IP Office

(57) ABSTRACT

A data storing method for a rewritable non-volatile memory module is provided. The method includes receiving page data to be stored in a first logical address. The method also includes determining whether a storage status of the rewritable non-volatile memory module is a predetermined status; if yes, using a first writing mode to write the page data into the rewritable non-volatile memory module; if no, using a second writing mode to write the page data into the rewritable non-volatile memory module. In the first writing mode, lower physical program units of the rewritable non-volatile memory module are applied for writing data, and upper physical program units of the rewritable non-volatile memory module are not applied for writing data; in the second writing mode, the upper physical program units and the lower physical program units are applied for writing data.

21 Claims, 11 Drawing Sheets

802 804

| Logical address | Physical address |
|---|---|
| LBA(0) | NULL |
| LBA(1) | PBA(0-1) |
| LBA(2) | NULL |
| ⋮ | ⋮ |
| LBA(128) | NULL |
| LBA(129) | PBA(0-3) |
| LBA(130) | NULL |
| ⋮ | ⋮ |
| LBA(H) | NULL |

| Logical address | Physical address |
|---|---|
| LBA(0) | NULL |
| LBA(1) | PBA(0-5) |
| LBA(2) | NULL |
| ⋮ | ⋮ |
| LBA(128) | NULL |
| LBA(129) | PBA(0-3) |
| LBA(130) | NULL |
| ⋮ | ⋮ |
| LBA(H) | NULL |

| Logical address | Physical address |
|---|---|
| LBA(0) | PBA(0-1) |
| LBA(1) | PBA(0-2) |
| LBA(2) | PBA(0-3) |
| ⋮ | ⋮ |
| LBA(H) | PAB(D-K) |

| Logical address | Physical address |
|---|---|
| LBA(0) | PBA(0-1) |
| LBA(1) | PBA((D+1)-1) |
| LBA(2) | PBA(0-3) |
| ⋮ | ⋮ |
| LBA(H) | PAB(D-K) |

| Logical address | Physical address |
|---|---|
| LBA(0) | PBA(0-1) |
| LBA(1) | PBA((D+1)-1) |
| LBA(2) | PBA(0-3) |
| ⋮ | ⋮ |
| LBA(128) | PBA(1-1) |
| LBA(129) | PBA((D+1)-2) |
| LBA(130) | PBA(1-3) |
| ⋮ | ⋮ |
| LBA(H) | PAB(D-K) |

FIG. 14

| Logical address | Physical address |
|---|---|
| LBA(0) | PBA(0-1) |
| LBA(1) | PBA((D+1)-3) |
| LBA(2) | PBA(0-3) |
| ⋮ | ⋮ |
| LBA(128) | PBA(1-1) |
| LBA(129) | PBA((D+1)-2) |
| LBA(130) | PBA(1-3) |
| ⋮ | ⋮ |
| LBA(H) | PAB(D-K) |

DATA STORING METHOD, AND MEMORY CONTROLLER AND MEMORY STORAGE APPARATUS USING THE SAME

CROSS-REFERENCE TO RELATED APPLICATION

This application is a continuation-in-part of and claims the priority benefit of U.S. application Ser. No. 12/649,739, filed on Dec. 30, 2009, now pending, and also claims the priority benefit of Taiwan application serial no. 101120517, filed on Jun. 7, 2012. The prior U.S. application Ser. No. 12/649,739 claims the priority benefit of Taiwan application serial no. 98139810, filed on Nov. 23, 2009. The entirety of each of the above-mentioned patent applications is hereby incorporated by reference herein and made a part of this specification.

BACKGROUND

1. Technology Field

The present invention relates to a data storing method for a rewritable non-volatile memory module, a memory controller using the data storing method, and a memory storage apparatus using the data storing method.

2. Description of Related Art

Along with the widespread of digital cameras, cell phones, and MP3 in recently years, the consumers' demand to storage media has increased drastically. Since a rewritable non-volatile memory has the characteristics of non-volatility of data, low power consumption, small volume, non-mechanical structure, and fast reading and writing speed, the rewritable non-volatile memory is the most adaptable memory to be applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

A NAND flash memory may be classified into a single level cell (SLC) NAND flash memory, a multi level cell (MLC) NAND flash memory, or a trinary level cell (TLC) NAND flash memory according to the number of bits which each memory cell thereof is capable of storing. Specifically, each memory cell in the SLC NAND flash memory can store one bit of data (i.e., "1" or "0"), each memory cell in the MLC NAND flash memory can store two bits of data, and each memory cell in the TLC NAND flash memory can store three bits of data.

In the NAND flash memory, a physical page is composed of several memory cells arranged on the same word line. Since each memory cell in the SLC NAND flash memory can store one bit of data, several memory cells arranged on the same word line in the SLC NAND flash memory correspond to one physical page.

By contrast, a floating gate storage layer in each memory cell of the MLC NAND flash memory can store two bits of data, and a storage state (i.e., "11," "10," "01," or "00") thereof includes the least significant bit (LSB) and the most significant bit (MSB). For instance, the first bit from the left of the storage states is the LSB, and the second bit from the left of the storage states is the MSB. Accordingly, several memory cells arranged on the same word line may constitute two physical pages, wherein the physical pages constituted by the LSB and the MSB of the memory cells are lower physical pages and upper physical pages, respectively. The speed of writing data into the lower physical page is faster than writing data into the upper physical page, and when a program fail occurs in the process of programming the upper physical page, the data stored in the lower physical page corresponding to the programmed upper physical page may be lost.

Similarly, each memory cell in the TLC NAND flash memory can store three bits of data, and storage state (i.e., "111," "110," "101," "100," "011," "010," "001," or "000") thereof includes the first bit (i.e., the LSB), the second bit (i.e., the center significant bit, CSB), and the third bit (i.e., the MSB) from the left of the storage states. Accordingly, several memory cells arranged on the same word line may constitute three physical pages, wherein the physical pages constituted by the LSB, the CSB, and the MSB of the memory cells are lower physical pages, middle physical pages, and upper physical pages, respectively. In particular, while several memory cells on the same word lines are programmed, choosing only the lower physical page is programmed, or choosing the lower, the middle, and the upper physical pages are simultaneously programmed; otherwise, the stored data may be lost.

In view of the above, the SLC NAND flash memory has the relatively fast response access in comparison with the MLC NAND flash memory or the TLC NAND flash memory, whereas the MLC NAND flash memory or the TLC NAND flash memory has large storage capacity and low costs. Therefore, how to accelerate the access function of the MLC NAND flash memory or the TLC NAND flash memory to improve the performance of the flash memory storage apparatus is one of the major subjects to which people skilled in the art are dedicated.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the invention is directed to a data storing method, a memory controller, and a memory storage apparatus capable of effectively improving data storage performance.

In an exemplary embodiment of the invention, a data storing method for storing data in a rewritable non-volatile memory module is provided. The rewritable non-volatile memory module includes a plurality of physical erase units, each of the physical erase units has a plurality of physical program units, the physical program units include a plurality of lower physical program units and a plurality of upper physical program units, and a speed of writing data into the lower physical program units is greater than a speed of writing the data into the upper physical program units. The data storing method includes configuring a plurality of logical addresses and receiving a page data from a host system, wherein the page data is stored in a first logical address of the logical addresses according to an instruction of the host system. The data storing method also includes selecting a first physical erase unit from the physical erase units and determining whether a storage status of the rewritable non-volatile memory module is a predetermined status, wherein the first physical erase unit belongs to a spare physical erase unit. The data storing method also includes, if the storage status of the rewritable non-volatile memory module is the predetermined status, using a first writing mode to write the page data into a first physical program unit of the physical program units in the first physical erase unit, and mapping the first logical address to the first physical program unit, wherein in the first writing mode the lower physical program units of the first physical erase unit are applied for writing data, and the upper physical program units of the first physical erase unit are not applied for writing data. If the storage status of the rewritable non-volatile memory module is not the predetermined status, the data storing method also includes using a second writing mode to write the page data into a second physical program unit of the physical program units in the first physical erase unit, and mapping the first logical address to the second physical program unit, wherein in the second writing mode the lower physical program units and the upper physical program units of the first physical erase unit are applied for writing data.

In an exemplary embodiment of the invention, a memory controller for controlling a rewritable non-volatile memory module is provided. The rewritable non-volatile memory module includes a plurality of physical erase units, each of the physical erase units has a plurality of physical program units, the physical program units include a plurality of lower physical program units and a plurality of upper physical program units, and a speed of writing data into the lower physical program units is greater than a speed of writing the data into the upper physical program units. The memory controller includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit is further configured to configure a plurality of logical addresses and receive a page data from a host system, wherein the page data is stored in a first logical address of the logical addresses according to an instruction of the host system. The memory management circuit is further configured to select a first physical erase unit from the physical erase units, and the first physical erase unit belongs to a spare physical erase unit. The memory management circuit is further configured to determine whether a storage status of the rewritable non-volatile memory module is a predetermined status. If the storage status of the rewritable non-volatile memory module is the predetermined status, the memory management circuit is further configured to use a first writing mode to write the page data into a first physical program unit of the physical program units in the first physical erase unit and map the first logical address to the first physical program unit, wherein in the first writing mode the lower physical program units of the first physical erase unit are applied for writing data, and the upper physical program units of the first physical erase unit are not applied for writing data. If the storage status of the rewritable non-volatile memory module is not the predetermined status, the memory management circuit is further configured to use a second writing mode to write the page data into a second physical program unit of the physical program units in the first physical erase unit and map the first logical address to the second physical program unit, wherein in the second writing mode the lower physical program units and the upper physical program units of the first physical erase unit are applied for writing data.

In an exemplary embodiment of the invention, a memory storage apparatus including a connector, a rewritable non-volatile memory module, and a memory controller is provided. The connector is configured to couple to a host system. The rewritable non-volatile memory module includes a plurality of physical erase units, and each of the physical erase units has a plurality of physical program units. The physical program units include a plurality of lower physical program units and a plurality of upper physical program units, and a speed of writing data into the lower physical program units is greater than a speed of writing the data into the upper physical program units. The memory controller is coupled to the connector and the rewritable non-volatile memory module. The memory controller is further configured to configure a plurality of logical addresses and receive a page data from a host system, wherein the page data is to be stored in a first logical address of the logical addresses according to an instruction of the host system. The memory controller is further configured to select a first physical erase unit from the physical erase units, and the first physical erase unit belongs to a spare physical erase unit. The memory controller is further configured to determine whether a storage status of the rewritable non-volatile memory module is a predetermined status. If the storage status of the rewritable non-volatile memory module is the predetermined status, the memory controller is further configured to use a first writing mode to write the page data into a first physical program unit of the physical program units in the first physical erase unit and map the first logical address to the first physical program unit, wherein in the first writing mode the lower physical program units of the first physical erase unit are applied for writing data, and the upper physical program units of the first physical erase unit are not applied for writing data. If the storage status of the rewritable non-volatile memory module is not the predetermined status, the memory controller is further configured to use a second writing mode to write the page data into a second physical program unit of the physical program units in the first physical erase unit and map the first logical address to the second physical program unit, wherein in the second writing mode the lower physical program units and the upper physical program units of the first physical erase unit are applied for writing data.

To sum up, according to an exemplary embodiment of the invention, it is likely to merely use the lower physical program units based on the storage status of the rewritable non-volatile memory module, so as to improve the performance of the flash memory storage apparatus.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 9 to FIG. 11 illustrate an example of performing a writing operation to update a logical address-physical address mapping table when a storage status of the rewritable non-volatile memory module 106 is a predetermined status.

FIG. 12 is a diagram illustrating an example of a logical address-physical address mapping table according to another exemplary embodiment of the invention.

FIG. 13 to FIG. 15 illustrate an example of performing a writing operation to update a logical address-physical address mapping table when a storage status of the rewritable non-volatile memory module 106 is not a predetermined status.

DESCRIPTION OF THE EMBODIMENTS

Figure 1:
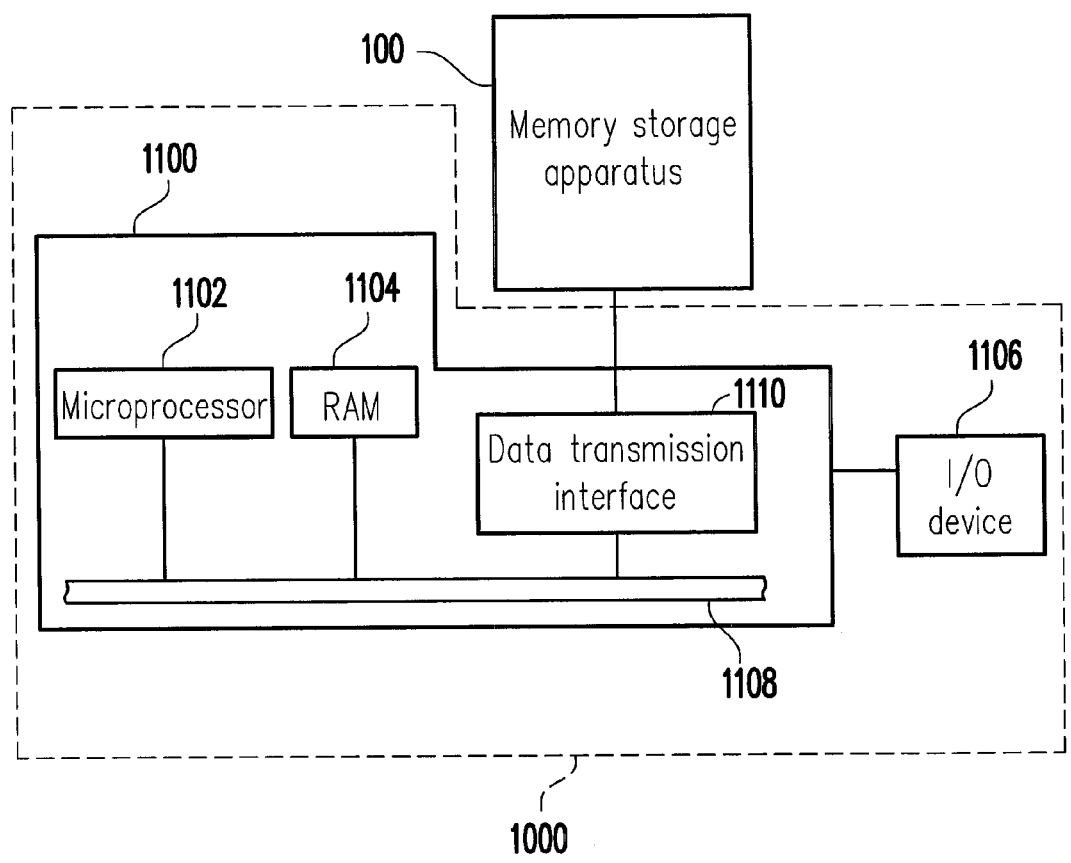
FIG. 1 illustrates a host system and a memory storage apparatus according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage apparatus (i.e., a memory storage system) typically includes a flash memory module and a controller (i.e., a control circuit). The memory storage apparatus is usually used together with a host system, such that the host system can write data into or read data from the memory storage apparatus.

FIG. 1 illustrates a host system and a memory storage apparatus according to an exemplary embodiment of the present invention.

Figure 2:
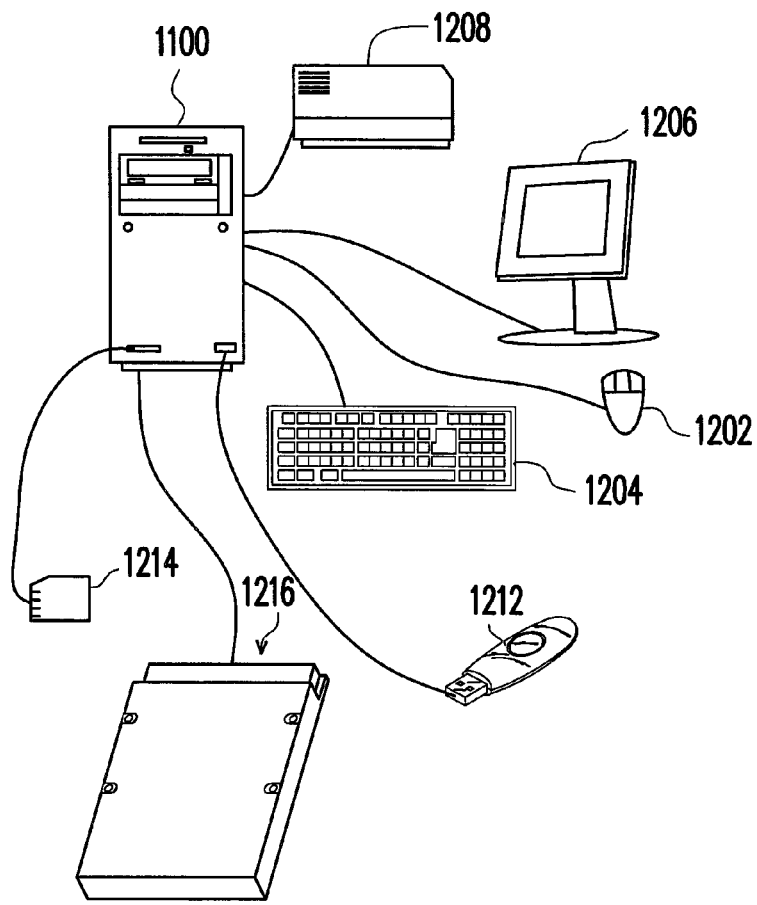
FIG. 2 schematically illustrates a computer, an input/output (I/O) device, and a memory storage apparatus according to an exemplary embodiment of the present invention.

With reference to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1252 as shown in FIG. 2. It should be understood that the I/O device 1106 is not limited to the devices illustrated in FIG. 2 and may further include other devices.

In the exemplary embodiment, the memory storage apparatus 100 is coupled to other devices of the host system 1000 through the data transmission interface 1110. By using the microprocessor 1102, the RAM 1104, and the I/O device 1106, the data can be written into or read from the memory storage apparatus 100. For instance, the memory storage apparatus 100 may be a rewritable non-volatile memory storage apparatus, such as a flash drive 1256, a memory card apparatus 1214, or a solid state drive (SSD) 1216 as shown in FIG. 2.

Figure 3:
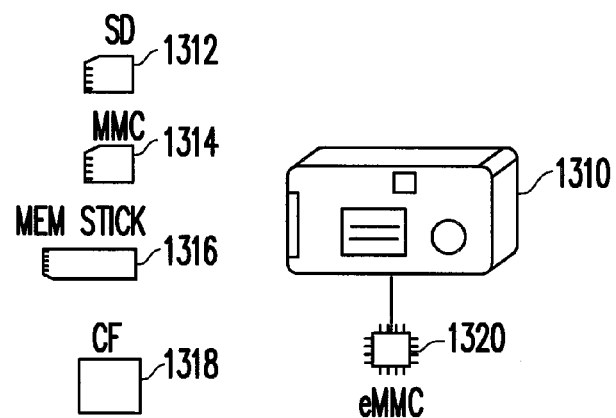
FIG. 3 schematically illustrates a host system and a memory storage apparatus according to an exemplary embodiment of the present invention.

Generally, the host system 1000 can substantially be any system used together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so forth. For instance, if the host system is a digital camera (video camera) 1310, the rewritable non-volatile memory storage apparatus is an SD card 1312, an MMC 1314, a memory stick 1316, a CF card 1318, or an embedded storage apparatus 1320 (as shown in FIG. 3). The embedded storage device 1320 includes an embedded MMC (eMMC). It should be mentioned that the eMMC is directly coupled to the substrate of the host system.

Figure 4:
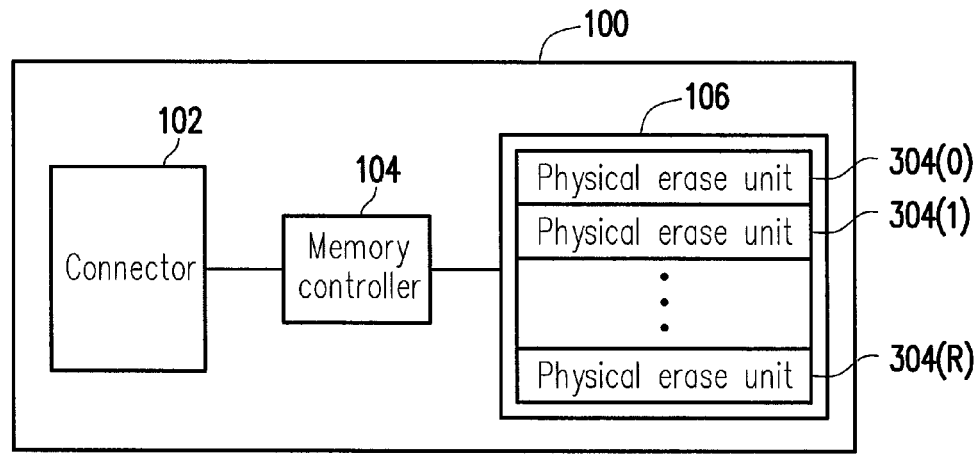
FIG. 4 is a schematic block diagram illustrating the memory storage apparatus depicted in FIG. 1.

FIG. 4 is a schematic block diagram illustrating the memory storage apparatus depicted in FIG. 1.

With reference to FIG. 4, the memory storage apparatus 100 includes a connector 102, a memory controller 104, and a rewritable non-volatile memory module 106.

In the present exemplary embodiment, the connector 102 complies with the serial advanced technology attachment (SATA) standard. However, the present invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) standard, the ultra high speed-I (UHS-I) interface standard, the ultra high speed-II (UHS-II) interface standard, the memory stick (MS) standard, the multimedia card (MMC) standard, the embedded multimedia card (eMMC) interface standard, the universal flash storage (UFS) interface standard, the compact flash (CF) standard, the integrated device electronics (IDE) standard, or other suitable standards.

The memory controller 104 is configured to execute a plurality of logic gates or control instructions implemented in a form of hardware or firmware and performing various data operations in the rewritable non-volatile memory module 106 according to commands issued by the host system 1000, such as data writing, reading, erasing, and so on.

The rewritable non-volatile memory module 106 is coupled to the memory controller 104 for storing data written by the host system 1000. The rewritable non-volatile memory module 106 has physical erase units 304(0)-304(R). The physical erase units 304(0)-304(R) may belong to the same memory die or different memory dies, for instance. Each of the physical erase units has a plurality of physical program units, and the physical program units belonging to the same physical erase unit may be individually written but have to be erased all together. For instance, each of the physical erase units may be composed of 128 physical program units; however, the invention is not limited thereto, and each of the physical erase units may also be composed of 64, 256, or any other number of physical program units.

To be specific, the physical erase unit is the smallest unit for erasing data. Namely, each physical erase unit contains the least number of memory cells which are erased all together. The physical program unit is the smallest unit for programming data. Namely, the physical program unit is the smallest unit for writing data. Each physical program unit usually includes a data bit area and a redundant bit area. The data bit area includes a plurality of physical access addresses for storing user data, and the redundant bit area is used for storing system data (e.g., error checking and correcting codes (ECCs)). In the present exemplary embodiment, the data bit area of each of the physical program units includes 4 physical access addresses, and the size of each of the physical access addresses is 512 bytes (B). However, the size and the number of the physical access addresses are not limited in the invention, and in other exemplary embodiments, the data bit area may also include a greater or smaller number of physical access addresses. In an exemplary embodiment, the physical erase units may be physical blocks, and the physical program units may be physical pages or physical sectors, which should not be construed as limitations to the invention.

In the present exemplary embodiment, the rewritable non-volatile memory module 106 is an MLC NAND flash memory module (i.e., a memory cell stores data of at least 2 bits). Nevertheless, in other exemplary embodiments, the rewritable non-volatile memory module 106 may also be a TLC NAND flash memory module, any other flash memory module, or any other memory module with the same characteristics.

Figure 5:
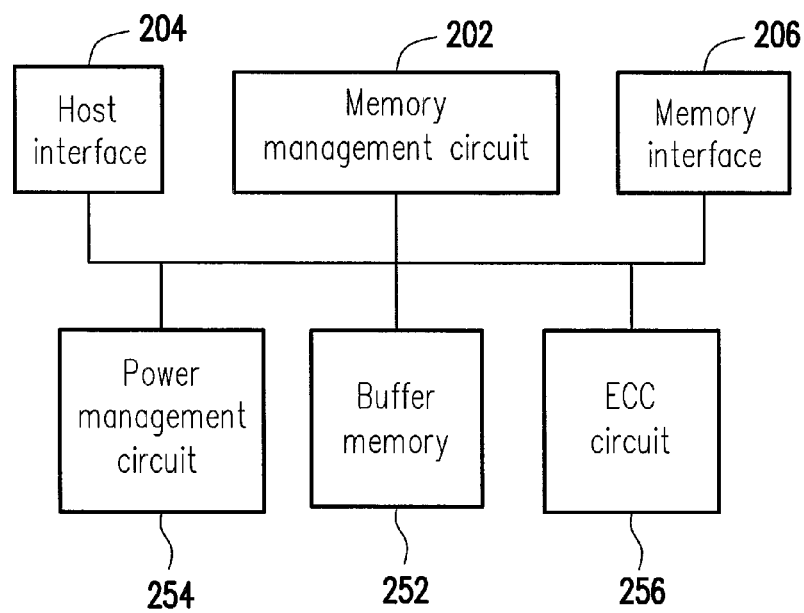
FIG. 5 is a schematic block diagram illustrating a memory controller according to an exemplary embodiment of the present invention.

FIG. 5 is a schematic block diagram illustrating a memory controller according to an exemplary embodiment of the present invention. Note that the structure of the memory controller shown in FIG. 5 is merely exemplary and should not be construed as a limitation to the invention.

With reference to FIG. 5, the memory controller 104 includes a memory management circuit 202, a host interface 204, and a memory interface 206.

The memory management circuit 202 controls the overall operation of the memory controller 104. Specifically, the memory management circuit 202 has a plurality of control instructions, and when the memory storage apparatus 100 is in operation, the control instructions are executed to perform data writing, data reading, and data erasing operations.

In the present exemplary embodiment, the control instructions of the memory management circuit 202 are implemented in a firmware form. For instance, the memory management circuit 202 has a microprocessor unit (not shown) and a read-only memory (ROM, not shown), and the control instructions are burnt into the ROM. When the memory storage apparatus 100 is in operation, the control instructions are executed by the microprocessor unit to carry out data writing, data reading, and data erasing operations.

In another exemplary embodiment of the invention, the control instructions of the memory management circuit 202 may also be stored in a specific area of the rewritable non-volatile memory module 106 (e.g., a system area exclusively used for storing system data in a memory module) in form of program codes. Additionally, the memory management circuit 202 has a microprocessor unit (not shown), a ROM (not shown), and a RAM (not shown). In particular, the ROM has boot codes. When the memory controller 104 is enabled, the microprocessor unit first executes the boot codes to load the control instructions from the rewritable non-volatile memory module 106 into the RAM of the memory management circuit 202. Thereafter, the microprocessor unit runs the control instructions to perform data writing, data reading, and data erasing operations.

In still another exemplary embodiment of the invention, the control instructions of the memory management circuit 202 may also be implemented in a hardware form. For instance, the memory management circuit 202 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the physical erase units of the rewritable non-volatile memory module 106; the memory writing circuit is configured to issue a write command to the rewritable non-volatile memory module 106 to write data into the rewritable non-volatile memory module 106; the memory reading circuit is configured to issue a read command to the rewritable non-volatile memory module 106 to read data from the rewritable non-volatile memory module 106; the memory erasing circuit is configured to issue an erase command to the rewritable non-volatile memory module 106 to erase data from the rewritable non-volatile memory module 106; the data processing circuit is configured to process data to be written into and read from the rewritable non-volatile memory module 106.

The host interface 204 is coupled to the memory management circuit 202 and configured to receive and identify commands and data from the host system 1000. Namely, commands and data from the host system 1000 are transmitted to the memory management circuit 202 through the host interface 204. In the present exemplary embodiment, the host interface 204 complies with the SATA standard. However, the invention is not limited thereto, and the host interface 204 may also comply with the PATA standard, the IEEE 1394 standard, the PCI express standard, the USB standard, the SD standard, the UHS-I interface standard, the UHS-II interface standard, the MS standard, the MMC standard, the eMMC standard, the UFS standard, the CF standard, the IDE standard, or any other appropriate data transmission standard.

The memory interface 206 is coupled to the memory management circuit 202 and configured to access the rewritable non-volatile memory module 106. Namely, data to be written into the rewritable non-volatile memory module 106 may be converted by the memory interface 206 into a format acceptable to the rewritable non-volatile memory module 106.

In an exemplary embodiment of the invention, the memory controller 104 further includes a buffer memory 252, a power management circuit 254, and an ECC circuit 256.

The buffer memory 252 is coupled to the memory management circuit 202 and configured to temporarily store data and commands from the host system 1000 or data from the rewritable non-volatile memory module 106.

The power management circuit 254 is coupled to the memory management circuit 202 and configured to control the power supply of the memory storage apparatus 100.

The ECC circuit 256 is coupled to the memory management circuit 202 and configured to execute an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 256 executes the ECC procedure on the read data according to the ECC code.

Figure 6:
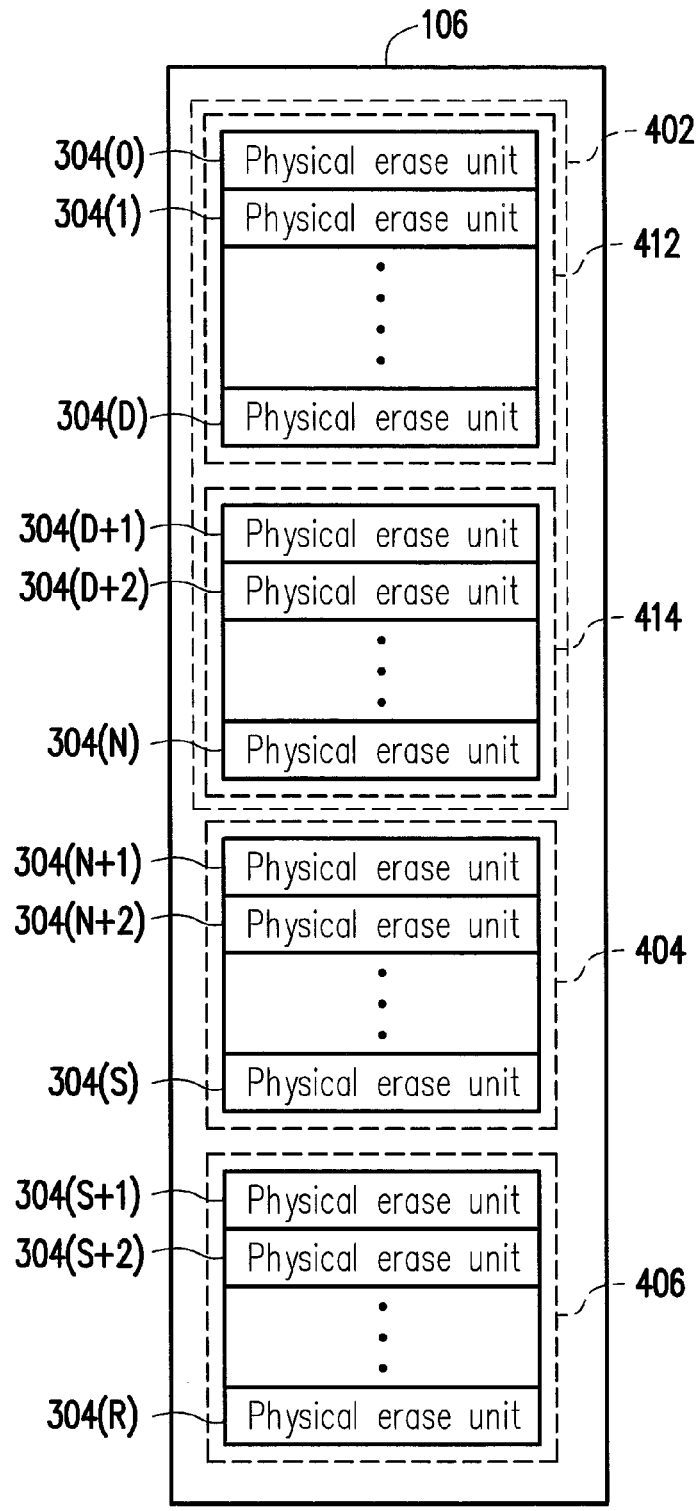
FIG. 6 and FIG. 7 are schematic diagrams illustrating management of a rewritable non-volatile memory module according to an exemplary embodiment of the present invention.
Figure 7:
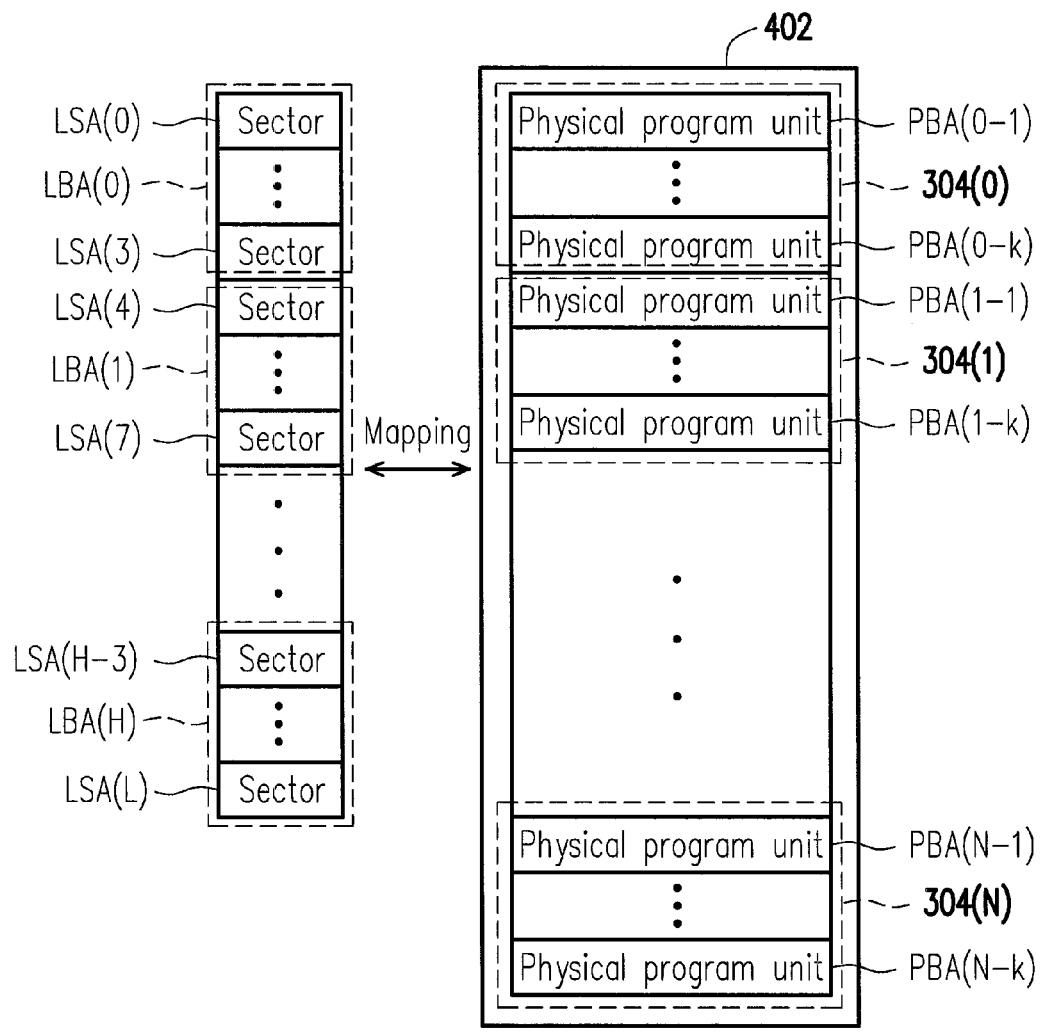

FIG. 6 and FIG. 7 are schematic diagrams illustrating management of a rewritable non-volatile memory module according to an exemplary embodiment of the present invention.

Note that the terms used herein for describing the operations (e.g., "get," "select," "replace," "exchange," "group," "alternate," etc.) performed on the physical erase units in the rewritable non-volatile memory module 106 refer to logical operations performed on these physical erase units. Namely, the actual positions of the physical erase units in the rewritable non-volatile memory module 106 are not changed; instead, the physical erase units in the rewritable non-volatile memory module 106 are logically operated.

With reference to FIG. 6, the memory controller 104 (or the memory management circuit 202) logically groups the physical erase units 304(0)~304(R) of the rewritable non-volatile memory module 106 into a storage area 402, a system area 404, and a replacement area 406.

The physical erase units logically belonging to the storage area 402 are used for storing data written by the host system 1000. That is, the memory storage apparatus 100 actually stores the data written by the host system 1000 in the physical erase units belonging to the storage area 402. In particularly, the memory controller 104 (or the memory management circuit 202) groups the storage area 402 into a data area 412 and a spare area 414. The physical erase units of the data area 412 (i.e., the data physical erase units) are physical erase units where data has been stored, and the physical erase units of the spare area 414 (i.e., the spare physical erase unit) are physical erase units which are used for substituting the physical erase units of the data area 412. Hence, the physical erase units of the spare area 414 are either blank or available physical erase units (i.e., no data is recorded in these physical erase units or data recorded in these physical erase units is marked as invalid data). In other words, the physical erase units of the spare area 414 have been operated by an erasing operation, or when a physical erase unit of the spare area 414 is gotten for storing data, the gotten physical erase unit needs to undergo the erasing operation first. Therefore, the physical erase units of the spare area 414 are available physical erase units. Particularly, when a physical erase unit is selected from the spare area 414 to store valid data, the selected physical erase unit is associated with the data area 412. Besides, the memory controller 104 (or the memory management circuit 202) performs a data erasing operation on the physical erase unit having the physical program units where the data stored in the data area 412 are all invalid, and the physical erase unit that has undergone the data erasing operation is associated with the spare area 414. Thereby, the physical erase unit may alternately store data written by the host system 1000.

The physical erase units logically belonging to the system area 404 are used for recording system data, and the system data includes information regarding a manufacturer and a model of the memory die, the number of the physical erase units in the memory die, the number of the physical program units in each physical erase unit, and so forth.

The physical erase units logically belonging to the replacement area 406 are replacement physical erase units. For instance, when the rewritable non-volatile memory module 106 is manufactured in the factory, 4% of the physical erase units thereof are reserved for replacement. Namely, when any physical erase unit in the data area 412, the spare area 414, and the system area 404 is damaged, a physical erase unit in the replacement area 406 is used for replacing the damaged physical erase unit (i.e., the bad physical erase unit). Thus, if there are still normal physical erase units in the replacement area 406 and a physical erase unit is damaged, the memory controller 104 gets a normal physical erase unit from the replacement area 406 for replacing the damaged physical erase unit. If there is no more normal physical erase unit in the replacement area 406 and a physical erase unit is damaged, the memory controller 104 announces the entire memory storage apparatus 100 as being in a write-protect status and can no longer be used for writing data.

In particular, the number of physical erase units in the storage area 402, the system area 404, and the replacement area 406 are changed based on different memory standards. Additionally, it should be understood that the grouping relationships of associating the physical erase units with the storage area 402, the system area 404, and the replacement area 406 are dynamically changed during the operation of the memory storage apparatus 100. For instance, when a physical erase unit of the storage area 402 is damaged and replaced by a physical erase unit of the replacement area 406, the physical erase unit of the replacement area 406 is associated with the storage area 402.

With reference to FIG. 7, as described above, the physical erase units of the data area 412 and the spare area 414 are alternated to store data written by the host system 1000. In the present exemplary embodiment, the memory controller 104 (or the memory management circuit 202) configures logical addresses LBA(0)~LBA(H) for the host system 1000 to properly access data in the physical erase units.

Each of the logical addresses is composed of several sectors. In the present exemplary embodiment, each of the logical addresses is composed of four sectors; for instance, the sectors LSA(0)~LSA(3) belong to the logical address LBA(0), the sectors LSA(4)~LSA(7) belong to the logical address LBA(1), the sectors LSA(8)~LSA(11) belong to the logical address LBA(2), and so on. However, the invention is not limited thereto, and in another exemplary embodiment of the invention, each of the logical addresses may be composed of eight or sixteen sectors.

For instance, the memory controller 104 (or the memory management circuit 202) maintains a logical address-physical address mapping table for recording the mapping relationship between the logical addresses and the physical program units. That is, when the host system 1000 is about to access data in a sector, the memory controller 104 (or the memory management circuit 202) identifies a logical address belonging to the sector and thereby accesses data at the physical program unit mapped to the logical address.

For instance, when the memory controller 104 (or the memory management circuit 202) starts to store data to be written by the host system 1000 in the physical erase unit 304(0), i.e., the physical erase unit 304(0) is gotten from the spare area 414 and associated with the data area 412, the memory controller 104 (or the memory management circuit 202) sequentially writes data into the physical program units of the physical erase unit 304(0), regardless of which logical address where the data is written by the host system 1000. When the memory controller 104 (or the memory management circuit 202) starts to store data to be written by the host system 1000 in the physical erase unit 304(1), i.e., the physical erase unit 304(1) is gotten from the spare area 414 and associated with the data area 412, the memory controller 104 (or the memory management circuit 202) sequentially writes data into the physical program units of the physical erase unit 304(1), regardless of which logical address where the data is written by the host system 1000. That is, when the data is about to be written by the host system 1000, the memory controller 104 (or the memory management circuit 202) sequentially uses the physical program units in one physical erase unit to write data, and only when the physical program units in the physical erase unit have stored data, the memory controller 104 (or the memory management circuit 202) selects another physical erase unit where no data is stored i.e., the memory controller 104 (or the memory management circuit 202) gets one physical erase unit from the spare area 414 and sequentially writes the data into the physical program units of the newly selected physical erase unit. In the exemplary embodiment, after the memory controller 104 (or the memory management circuit 202) writes the data into the physical program units, the memory controller 104 (or the memory management circuit 202) updates the logical address-physical address mapping table to correctly record the mapping relationships between the logical addresses and the physical program units.

Figure 8:
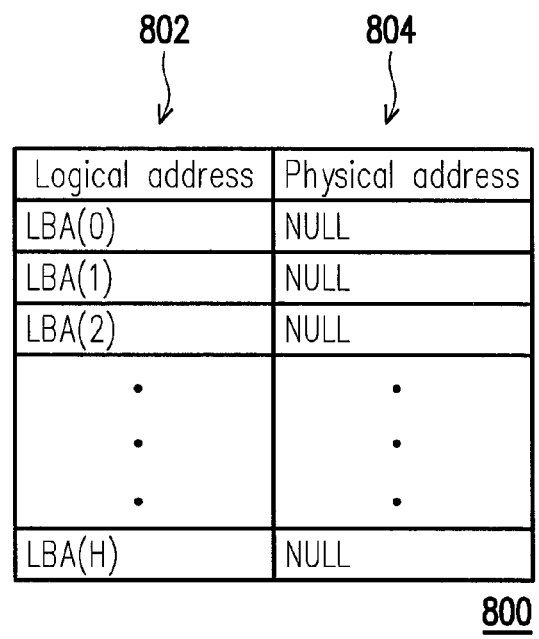
FIG. 8 is a diagram illustrating an example of a logical address-physical address mapping table according to an exemplary embodiment of the invention.

FIG. 8 is a diagram illustrating an example of a logical address-physical address mapping table according to an exemplary embodiment of the invention.

With reference to FIG. 8, the logical address-physical address mapping table 800 includes a logical address field 802 and a physical address field 804. The logical address field 802 records the number of each configured logical address, and the physical address field 804 records the physical program unit mapped to each logical address. In the event that the memory storage apparatus 100 is brand new and has never stored data, the physical erase units 304(0)~304(N) are associated with the spare area 414, and in the logical address-physical address mapping table 800 the field recording the physical program unit correspondingly mapped to each logical address is marked as NULL, for instance.

In the present exemplary embodiment, the rewritable non-volatile memory module 106 is an MLC NAND flash memory module, and the physical program units of each physical erase unit may be grouped into lower physical program units (i.e., fast physical program units) and upper physical program units (i.e., slow physical program units) according to the access speed of the physical program units. For instance, the physical program units PBA(0-1), PBA(0-3), PBA(0-5), . . . , and PBA(0-(K−1)) of the physical erase unit 304(0) are the lower physical program units, and the physical program units PBA(0-2), PAB(0-4), PBA(0-6), . . . , and PBA(K) of the physical erase unit 304(0) are the upper physical program units. Here, K is an even integer. It should be mentioned that the rewritable non-volatile memory module 106 in other exemplary embodiments of the invention may be a TLC NAND flash memory module or any other MLC flash memory chip. For instance, the rewritable non-volatile memory module 106 may be a TLC NAND flash memory module, and the physical program units of each physical erase unit may be grouped into lower physical program units (i.e., fast physical program units), middle physical program units (i.e., middle-speed physical program units), and upper physical program units (i.e., slow physical program units) according to the access speed of the physical program units.

Particularly, when a page data is to be written into a physical program unit, the memory controller 104 (or the memory management circuit 202) determines a storage status of the rewritable non-volatile memory module 106. If the storage status of the rewritable non-volatile memory module 106 is a predetermined status, the memory controller 104 (or the memory management circuit 202) uses a first writing mode to write the page data into the rewritable non-volatile memory module 106; if the storage status of the rewritable non-volatile memory module 106 is not the predetermined status, the memory controller 104 (or the memory management circuit 202) uses a second writing mode to write the page data into the rewritable non-volatile memory module 106.

According to the present exemplary embodiment, in the first writing mode, the memory controller 104 (or the memory management circuit 202) does not use the upper physical program units but uses the lower physical program units to store the data to be written by the host system 1000. In the second writing mode, the memory controller 104 (or the memory management circuit 202) uses the upper physical program units and the lower physical program units to store the data to be written by the host system 1000. Namely, in the second writing mode, the upper physical program units and the lower physical program units of the rewritable non-volatile memory module 106 are used for storing data, while only the lower physical program units are used for data storage in the first writing mode. Therefore, the data writing speed in the first writing mode is greater than the data writing speed in the second writing mode. Note that the rewritable non-volatile memory module 106 may not be the MLC NAND flash memory module in other exemplary embodiments of the invention. When the rewritable non-volatile memory module is the TLC NAND flash memory module, the memory controller 104 (or the memory management circuit 202) in the first writing mode does not use the upper and middle physical program units but uses the lower physical program units to store the data to be written by the host system 1000. In the second writing mode, the memory controller 104 (or the memory management circuit 202) uses the upper physical program units, the middle physical program units, and the lower physical program units to store the data to be written by the host system 1000.

According to the present exemplary embodiment, the memory controller 104 (or the memory management circuit 202) determines whether the number of the physical program units storing valid data in the rewritable non-volatile memory module 106 is smaller than a first threshold value. If the number of the physical program units storing the valid data in the rewritable non-volatile memory module 106 is smaller than the first threshold value, the memory controller 104 (or the memory management circuit 202) identifies that the storage status of the rewritable non-volatile memory module 106 is a predetermined status; if the number of the physical program units storing the valid data in the rewritable non-volatile memory module 106 is not smaller than the first threshold value, the memory controller 104 (or the memory management circuit 202) identifies that the storage status of the rewritable non-volatile memory module 106 is not the predetermined status. Here, the first threshold value may be the product of the number of all of the physical program units and a predetermined ratio. For instance, when the rewritable non-volatile memory module 106 is the MLC NAND flash memory module, the predetermined ratio may be 50%; however, the invention is not limited thereto. When the rewritable non-volatile memory module 106 is the TLC NAND flash memory module, the predetermined ratio may be 30%, for instance.

According to the present exemplary embodiment, the memory controller 104 (or the memory management circuit 202) determines whether the number of the physical program units storing valid data in the rewritable non-volatile memory module 106 is smaller than a first threshold value according to the information in the logical address-physical address mapping table. In particular, when a valid data belonging to a logical address is written into one physical program unit, the logical address is mapped to the physical program unit in the logical address-physical address mapping table. Thereby, the memory controller 104 (or the memory management circuit 202) may get the number of the physical program units storing valid data by calculating the number of the physical program units recorded in the logical address-physical address mapping table.

As discussed above, whether the storage status of the rewritable non-volatile memory module 106 is the predetermined status may be determined by comparing the number of the physical program units storing valid data in the rewritable non-volatile memory module 106 with the first threshold value. However, in another exemplary embodiment of the invention, the memory controller 104 (or the memory management circuit 202) may also determine whether the storage status of the rewritable non-volatile memory module 106 is the predetermined status based on the number of the physical erase units in the spare area 414. Specifically, if the number of the physical erase units in the spare area 414 is smaller than a second threshold value, the memory controller 104 (or the memory management circuit 202) identifies that the storage status of the rewritable non-volatile memory module 106 is not the predetermined status; if the number of the physical erase units in the spare area 414 is not smaller than the second threshold value, the memory controller 104 (or the memory management circuit 202) identifies that the storage status of the rewritable non-volatile memory module 106 is the predetermined status. Here, the second threshold value may be set as 8, for instance; however, the present invention is not limited thereto.

Figure 9:
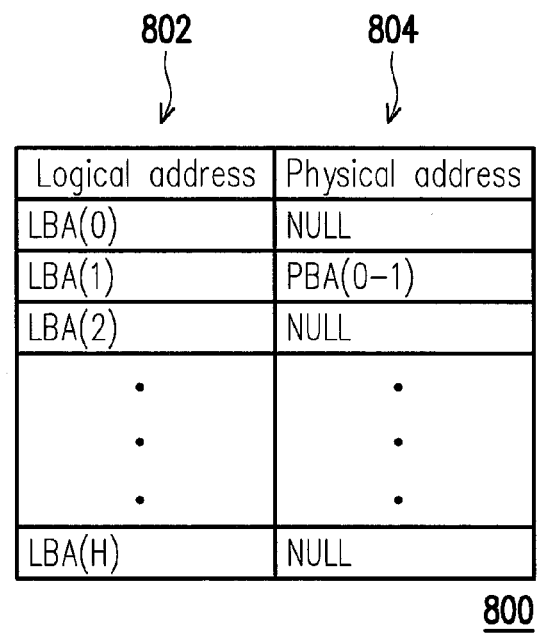

FIG. 9 to FIG. 11 illustrate an example of performing a writing operation to update a logical address-physical address mapping table when a storage status of the rewritable non-volatile memory module 106 is the predetermined status.

With reference to FIG. 9, given that the host system 1000 is about to write a page data into a logical address LBA(1) in a state shown in FIG. 8, the memory controller 104 (or the memory management circuit 202) selects a physical erase unit (e.g., the physical erase unit 304(0)) from the spare area 414 and writes the page data to be written by the host system 1000 into the physical program unit PBA(0-1). After the data writing operation is completed, the memory controller 104 (or the memory management unit 202) maps the logical address LBA(1) to the physical program unit PBA(0-1) in the logical address-physical address mapping table 800.

With reference to FIG. 10, given that the host system 1000 is about to write a page data into a logical address LBA(129) in a state shown in FIG. 9, the memory controller 104 (or the memory management circuit 202) writes the page data to be written by the host system 1000 into the physical program unit PBA(0-3). At this time, the memory controller 104 (or the memory management unit 202) maps the logical address LBA(129) to the physical program unit PBA(0-3) in the logical address-physical address mapping table 800.

With reference to FIG. 11, given that the host system 1000 is about to write a page data into a logical address LBA(1) in a state shown in FIG. 10, the memory controller 104 (or the memory management circuit 202) writes the page data to be written by the host system 1000 into the physical program unit PBA(0-5). At this time, the memory controller 104 (or the memory management unit 202) maps the logical address LBA(1) to the physical program unit PBA(0-5) in the logical address-physical address mapping table 800.

In the data writing operation shown in FIG. 9 to FIG. 11, the storage status of the rewritable non-volatile memory module 106 is the predetermined status; therefore, the memory controller 104 (or the memory management circuit 202) does not used the upper program units but uses the lower physical program units (i.e., the physical program units PBA(0-1), PBA(0-3), and PBA(0-5)) to write the page data thereinto (i.e., the first writing mode).

FIG. 12 is a diagram illustrating an example of a logical address-physical address mapping table according to another exemplary embodiment of the invention.

With reference to FIG. 12, if all of the logical addresses store the valid data, each logical address in the logical address-physical address mapping table 800 is mapped to one physical program unit. Thereby, since the number of the physical program units storing the valid data is greater than the first threshold value, the memory controller 104 (or the memory management circuit 202) identifies that the storage status of the rewritable non-volatile memory module 106 is not the predetermined status.

FIG. 13 to FIG. 15 illustrate an example of performing a writing operation to update a logical address-physical address mapping table when a storage status of the rewritable non-volatile memory module 106 is not the predetermined status.

With reference to FIG. 13, given that the host system 1000 is about to write a page data into a logical address LBA(1) in a state shown in FIG. 13, the memory controller 104 (or the memory management circuit 202) selects a physical erase unit (e.g., the physical erase unit 304(D+1)) from the spare area 414 and writes the page data to be written by the host system 1000 into the physical program unit PBA((D+1)-1). After the data writing operation is completed, the memory controller 104 (or the memory management unit 202) maps the logical address LBA(1) to the physical program unit PBA((D+1)-1) in the logical address-physical address mapping table 800.

With reference to FIG. 14, given that the host system 1000 is about to write a page data into a logical address LBA(129) in a state shown in FIG. 13, the memory controller 104 (or the memory management circuit 202) writes the page data to be written by the host system 1000 into the physical program unit PBA((D+1)-2). At this time, the memory controller 104 (or the memory management unit 202) maps the logical address LBA(129) to the physical program unit PBA((D+1)-2) in the logical address-physical address mapping table 800.

With reference to FIG. 15, given that the host system 1000 is about to write a page data into a logical address LBA(1) in a state shown in FIG. 14, the memory controller 104 (or the memory management circuit 202) writes the page data to be written by the host system 1000 into the physical program unit PBA((D+1)-3). At this time, the memory controller 104 (or the memory management unit 202) maps the logical address LBA(1) to the physical program unit PBA((D+1)-3) in the logical address-physical address mapping table 800.

In the data writing operation shown in FIG. 13 to FIG. 15, the storage status of the rewritable non-volatile memory module 106 is not the predetermined status; therefore, the lower physical program units and the upper physical program units (i.e., the physical program units PBA((D+1)-1), PBA((D+1)-2), and PBA((D+1)-3)) are applied for writing the page data thereinto (i.e., the second writing mode).

Figure 16:
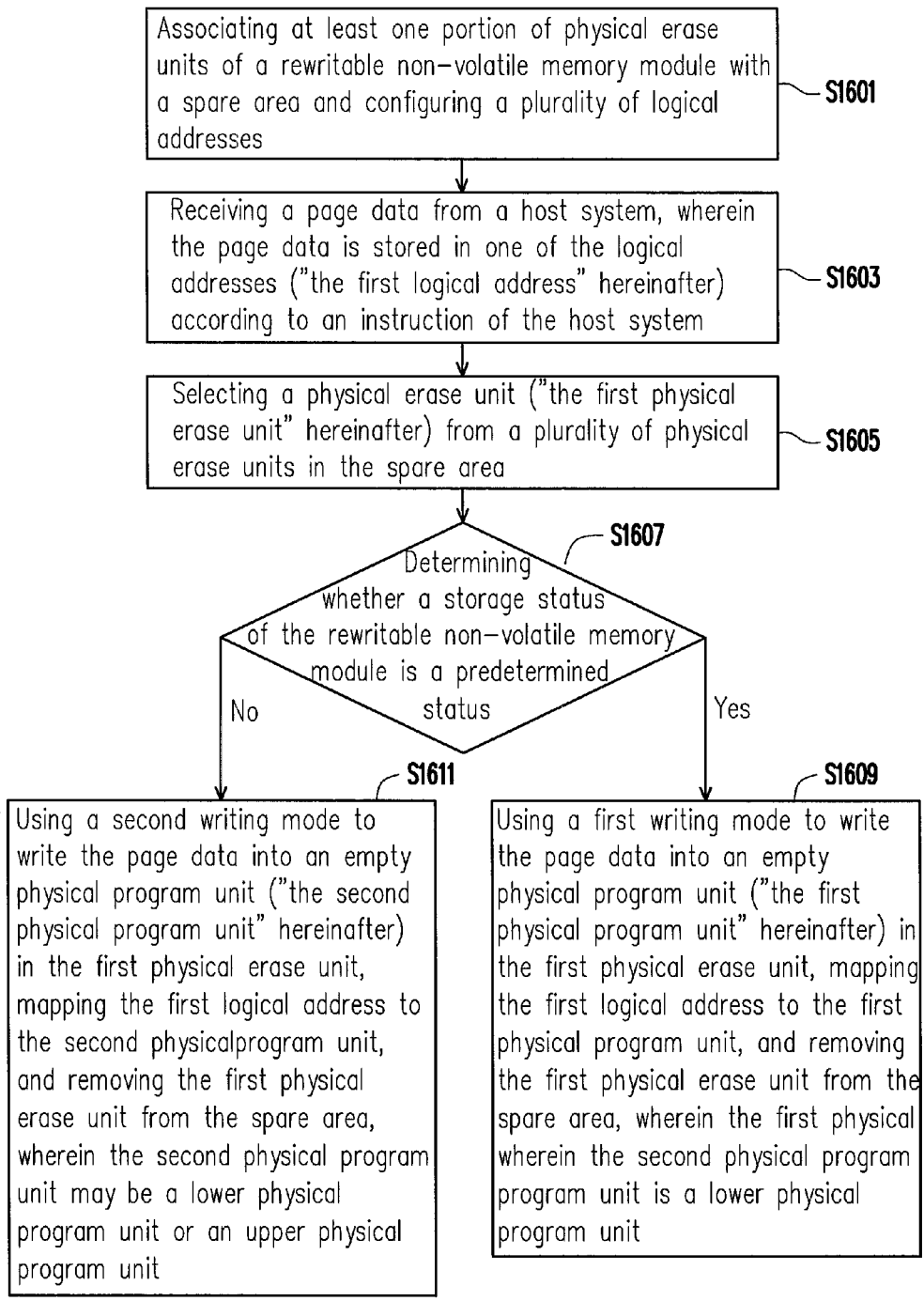
FIG. 16 is a flowchart illustrating a data storing method according to an exemplary embodiment of the present invention.

FIG. 16 is a flowchart illustrating a data storing method according to an exemplary embodiment of the present invention.

With reference to FIG. 16, in step S1601, the memory controller 104 (or the memory management circuit 202) associates at least one portion of the physical erase units of the rewritable non-volatile memory module 106 with the spare area 414 and configures a plurality of logical addresses.

In step S1603, the memory controller 104 (or the memory management circuit 202) receives a page data from a host system 1000, wherein the page data is stored in one of the logical addresses ("the first logical address" hereinafter) according to an instruction of the host system 1000.

In step S1605, the memory controller 104 (or the memory management circuit 202) selects a physical erase unit ("the first physical erase unit" hereinafter) from the physical erase units in the spare area 414.

In step S1607, the memory controller 104 (or the memory management circuit 202) determines whether a storage status of the rewritable non-volatile memory module 106 is a predetermined status.

If the storage status of the rewritable non-volatile memory module 106 is the predetermined status, in step S1609, the memory controller 104 (or the memory management circuit 202) uses the first writing mode to write the page data into an empty physical program unit ("the first physical program unit" hereinafter) in the first physical erase unit, maps the first logical address to the first physical program unit, and removes the first physical erase unit from the spare area 414. Here, the first physical program unit is a lower physical program unit.

If the storage status of the rewritable non-volatile memory module 106 is not the predetermined status, in step S1611, the memory controller 104 (or the memory management circuit 202) uses the second writing mode to write the page data into an empty physical program unit ("the second physical program unit" hereinafter) in the first physical erase unit, maps the first logical address to the second physical program unit, and removes the first physical erase unit from the spare area 414. Here, the second physical program unit may be a lower physical program unit or an upper physical program unit.

As discussed above, the memory controller 104 (or the memory management circuit 202) may determine whether the storage status of the rewritable non-volatile memory module 106 is the predetermined status based on the number of the physical program units storing valid data in the rewritable non-volatile memory module 106 or the number of the physical erase units in the spare area 414. Particularly, in another exemplary embodiment of the invention, the memory controller 104 (or the memory management circuit 202) may, based on the wear of the non-volatile memory module 106, adopt the number of the physical program units storing valid data in the rewritable non-volatile memory module 106 or the number of the physical erase units in the spare area 414 to identify the storage status of the rewritable non-volatile memory module 106 according to.

Specifically, the memory controller 104 (or the memory management circuit 202) records the number of erasing operations performed on each physical erase unit and calculates the average number of erasing operations performed on all of the physical erase units. Here, when each of the physical erase units undergoes an erasing operation, the number of the erasing operations performed on the physical erase unit is increased by one, for instance. Besides, the memory controller 104 (or the memory management circuit 202) determines whether the average number of the erasing operations performed on all of the physical erase units is greater than a third threshold value. If the average number of the erasing operations performed on all of the physical erase units is greater than the third threshold value, the memory controller 104 (or the memory management circuit 202) may identifies the storage status of the rewritable non-volatile memory module 106 based on the number of the physical program units storing valid data in the rewritable non-volatile memory module 106. By contrast, if the average number of the erasing operations performed on all of the physical erase units is not greater than the third threshold value, the memory controller 104 (or the memory management circuit 202) may identify the storage status of the rewritable non-volatile memory module 414 based on the number of the physical erase units in the spare area 414. Here, the third threshold value is set as 4000; however, the invention is not limited thereto.

Figure 17:
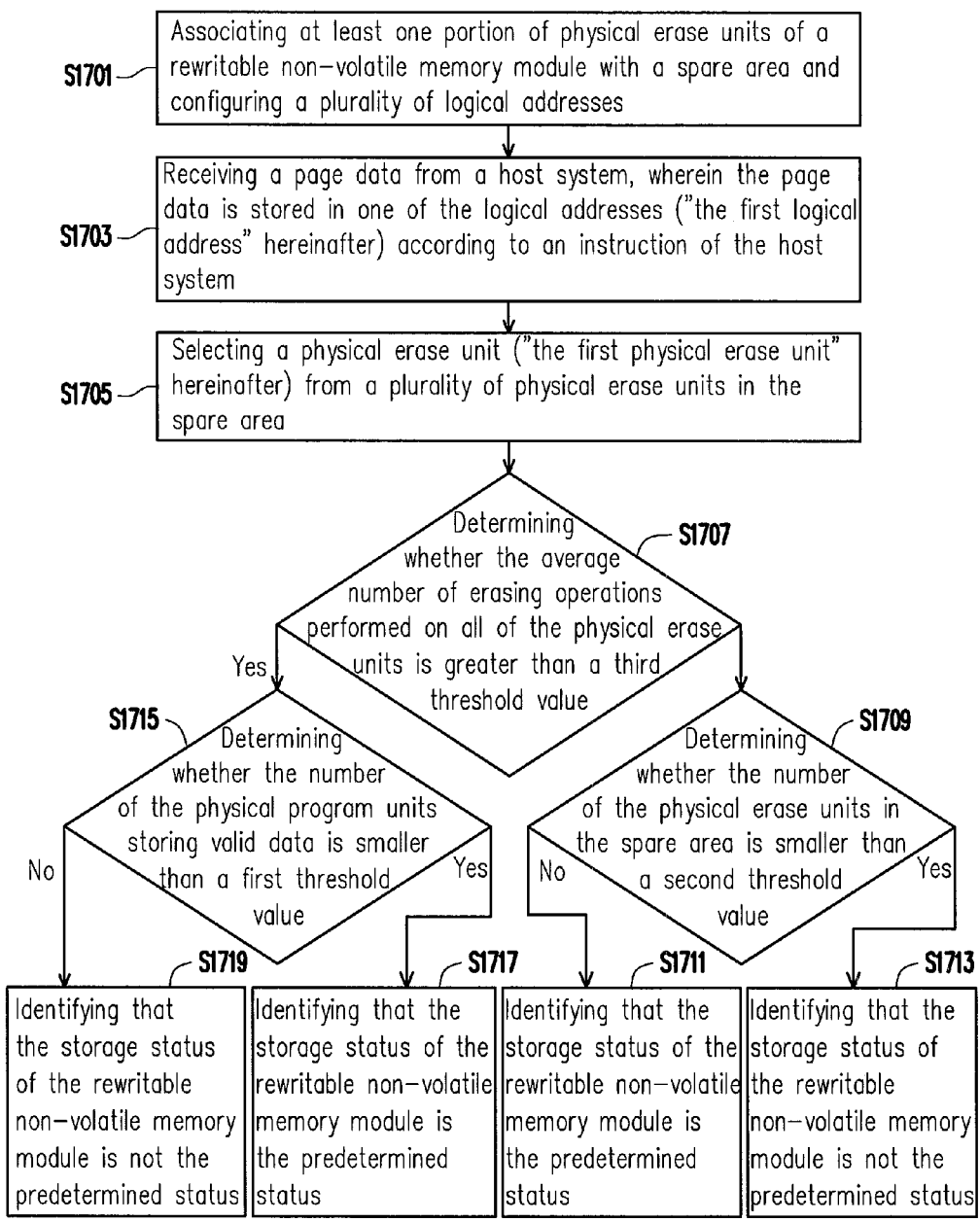
FIG. 17 is a flowchart illustrating a data storing method according to another exemplary embodiment of the present invention.

FIG. 17 is a flowchart illustrating a data storing method according to another exemplary embodiment of the present invention.

With reference to FIG. 17, in step S1701, the memory controller 104 (or the memory management circuit 202) associates at least one portion of the physical erase units of the rewritable non-volatile memory module 106 with the spare area 412 and configures a plurality of logical addresses.

In step S1703, the memory controller 104 (or the memory management circuit 202) receives a page data from a host system 1000, wherein the page data is stored in one of the logical addresses ("the first logical address" hereinafter) according to an instruction of the host system 1000.

In step S1705, the memory controller 104 (or the memory management circuit 202) selects a physical erase unit ("the first physical erase unit" hereinafter) from the physical erase units in the spare area 414.

In step S1707, the memory controller 104 (or the memory management circuit 202) determines whether the average number of the erasing operations performed on all of the physical erase units is greater than a third threshold value.

If the average number of the erasing operations performed on all of the physical erase units is not greater than the third threshold value, in step S1709, the memory controller 104 (or the memory management circuit 202) determines whether the number of the physical erase units in the spare area 414 is smaller than a second threshold value.

If the number of the physical erase units in the spare area 414 is not smaller than the second threshold value, in step S1711, the memory controller 104 (or the memory management circuit 202) determines the storage status of the rewritable non-volatile memory module 106 to be the predetermined status.

If the number of the physical erase units in the spare area 414 is smaller than the second threshold value, in step S1713, the memory controller 104 (or the memory management circuit 202) determines the storage status of the rewritable non-volatile memory module 106 not to be the predetermined status.

If the average number of the erasing operations performed on all of the physical erase units is greater than the third threshold value, in step S1715, the memory controller 104 (or the memory management circuit 202) determines whether the number of the physical program units storing valid data is smaller than a first threshold value.

If the number of the physical program units storing the valid data is smaller than the first threshold value, in step S1717, the memory controller 104 (or the memory management circuit 202) determines the storage status of the rewritable non-volatile memory module 106 to be the predetermined status.

If the number of the physical program units storing the valid data is not smaller than the first threshold value, in step S1719, the memory controller 104 (or the memory management circuit 202) determines the storage status of the rewritable non-volatile memory module 106 not to be the predetermined status.

To sum up, according to the data storing method, the memory controller using the method, and the memory storage apparatus using the method described in the exemplary embodiments of the invention, data may be stored based on the storage status of the memory module in different writing modes, and thereby the data writing speed can be increased.

What are described above are only embodiments of the invention and do not limit the scope of the invention. Simple and equivalent variations and modifications according to the claims and specification of the invention are still within the scope of the claimed invention. In addition, each of the embodiments and claims does not have to achieve all the advantages or characteristics which are disclosed in the invention. Moreover, the abstract and title only serve to facilitate search of patent documents and are not intended in any way to limit the scope of the claimed invention.

What is claimed is:

1. A method for storing data in a rewritable non-volatile memory module, wherein the rewritable non-volatile memory module comprises a plurality of physical erase units, each of the physical erase units has a plurality of physical program units, the physical program units comprise a plurality of lower physical program units and a plurality of upper physical program units, a speed of writing data into the lower physical program units is greater than a speed of writing data into the upper physical program units, and the method comprises:

configuring a plurality of logical addresses;

receiving a page data from a host system, wherein the page data is to be stored in a first logical address of the logical addresses according to an instruction of the host system;

selecting a first physical erase unit from the physical erase units, wherein the first physical erase unit belongs to a spare physical erase unit;

determining whether a storage status of the rewritable non-volatile memory module is a predetermined status;

if the storage status of the rewritable non-volatile memory module is the predetermined status, using a first writing mode to write the page data into a first physical program unit of the physical program units in the first physical erase unit, and mapping the first logical address to the first physical program unit, wherein in the first writing mode the lower physical program units of the first physical erase unit are applied for writing data, and the upper physical program units of the first physical erase unit are not applied for writing data; and if the storage status of the rewritable non-volatile memory module is not the predetermined status, using a second writing mode to write the page data into a second physical program unit of the physical program units in the first physical erase unit, and mapping the first logical address to the second physical program unit, wherein in the second writing mode the lower physical program units and the upper physical program units of the first physical erase unit are applied for writing data.

2. The method as recited in claim 1, wherein the spare physical erase unit comprises a physical erase unit of the physical erase units in which no data is stored or a physical erase unit of the physical erase units in which invalid data is stored.

3. The method as recited in claim 1, wherein the step of determining whether the storage status of the rewritable non-volatile memory module is the predetermined status comprises:

determining whether the number of the physical program units storing valid data is smaller than a first threshold value;

if the number of the physical program units storing the valid data is smaller than the first threshold value, identifying that the storage status of the rewritable non-volatile memory module is the predetermined status, if the number of the physical program units storing the valid data is not smaller than the first threshold value, identifying that the storage status of the rewritable non-volatile memory module is not the predetermined status.

4. The method as recited in claim 1, wherein the step of determining whether the storage status of the rewritable non-volatile memory module is the predetermined status comprises:

determining whether the number of the physical erase units belonging to the spare physical erase unit is smaller than a second threshold value;

if the number of the physical erase units belonging to the spare physical erase unit is not smaller than the second threshold value, identifying that the storage status of the rewritable non-volatile memory module is the predetermined status, if the number of the physical erase units belonging to the spare physical erase unit is smaller than the second threshold value, identifying that the storage status of the rewritable non-volatile memory module is not the predetermined status.

5. The method as recited in claim 1, wherein the step of determining whether the storage status of the rewritable non-volatile memory module is the predetermined status comprises:

determining whether the average number of erasing operations performed on the physical erase units is greater than a third threshold value;

if the average number of the erasing operations performed on the physical erase units is not greater than the third threshold value, determining whether the number of the physical erase units belonging to the spare physical erase unit is smaller than a second threshold value;

if the number of the physical erase units belonging to the spare physical erase unit is not smaller than the second threshold value, identifying that the storage status of the rewritable non-volatile memory module is the predetermined status;

if the number of the physical erase units belonging to the spare physical erase unit is smaller than the second threshold value, identifying that the storage status of the rewritable non-volatile memory module is not the predetermined status;

if the average number of the erasing operations performed on the physical erase units is greater than the third threshold value, determining whether the number of the physical program units storing valid data is smaller than a first threshold value;

if the number of the physical program units storing the valid data is smaller than the first threshold value, identifying that the storage status of the rewritable non-volatile memory module is the predetermined status; and if the number of the physical program units storing the valid data is not smaller than the first threshold value, identifying that the storage status of the rewritable non-volatile memory module is not the predetermined status.

6. The method as recited in claim 1, wherein the physical program units of each of the physical erase units further comprise a plurality of middle physical program unit, the speed of writing data into the lower physical program units is greater than a speed of writing the data into the middle physical program units, and the speed of writing data into the middle physical program units is greater than the speed of writing the data into the upper physical program units, wherein in the second writing mode the lower physical program units, the middle physical program units, and the upper physical program units of the first physical erase unit are applied for writing data.

7. The method as recited in claim 3, wherein the first threshold value is a product of the number of the physical program units of all of the physical erase units and a predetermined ratio.

8. A memory controller for controlling a rewritable non-volatile memory module, wherein the rewritable non-volatile memory module comprises a plurality of physical erase units, each of the physical erase units has a plurality of physical program units, the physical program units comprise a plurality of lower physical program units and a plurality of upper physical program units, a speed of writing data into the lower physical program units is greater than a speed of writing data into the upper physical program units, and the memory controller comprises:

a host interface configured to couple to a host system;

a memory interface configured to couple to the rewritable non-volatile memory module; and a memory management circuit coupled to the host interface and the memory interface, wherein the memory management circuit is configured to configure a plurality of logical addresses and receive a page data from the host system, wherein the page data is stored in a first logical address of the logical addresses according to an instruction of the host system, wherein the memory management circuit is further configured to select a first physical erase unit from the physical erase units, and the first physical erase unit belongs to a spare physical erase unit, wherein the memory management circuit is further configured to determine whether a storage status of the rewritable non-volatile memory module is a predetermined status, wherein if the storage status of the rewritable non-volatile memory module is the predetermined status, the memory management circuit is further configured to use a first writing mode to write the page data into a first physical program unit of the physical program units in the first physical erase unit and map the first logical address to the first physical program unit, wherein in the first writing mode the lower physical program units of the first physical erase unit are applied for writing data, and the upper physical program units of the first physical erase unit are not applied for writing data, wherein if the storage status of the rewritable non-volatile memory module is not the predetermined status, the memory management circuit is further configured to use a second writing mode to write the page data into a second physical program unit of the physical program units in the first physical erase unit and map the first logical address to the second physical program unit, wherein in the second writing mode the lower physical program units and the upper physical program units of the first physical erase unit are applied for writing data.

9. The memory controller as recited in claim 8, wherein the spare physical erase unit comprises a physical erase unit of the physical erase units in which no data is stored or a physical erase unit of the physical erase units in which invalid data is stored.

10. The memory controller as recited in claim 8, wherein the memory management circuit determines whether the number of the physical program units storing valid data is smaller than a first threshold value, if the number of the physical program units storing the valid data is smaller than the first threshold value, the memory management circuit identifies that the storage status of the rewritable non-volatile memory module is the predetermined status, and if the number of the physical program units storing the valid data is not smaller than the first threshold value, the memory management circuit identifies that the storage status of the rewritable non-volatile memory module is not the predetermined status.

11. The memory controller as recited in claim 8, wherein the memory management circuit determines whether the number of the physical program units belonging to the spare physical erase unit is smaller than a second threshold value, if the number of the physical erase units belonging to the spare physical erase unit is not smaller than the second threshold value, the memory management circuit identifies that the storage status of the rewritable non-volatile memory module is the predetermined status, if the number of the physical erase units belonging to the spare physical erase unit is smaller than the second threshold value, the memory management circuit identifies that the storage status of the rewritable non-volatile memory module is not the predetermined status.

12. The memory controller as recited in claim 8, wherein the memory management circuit determines whether the average number of erasing operations performed on the physical erase units is greater than a third threshold value;

wherein if the average number of the erasing operations performed on the physical erase units is not greater than the third threshold value, the memory management circuit determines whether the number of the physical erase units belonging to the spare physical erase unit is smaller than a second threshold value, if the number of the physical erase units belonging to the spare physical erase unit is not smaller than the second threshold value, the memory management circuit identifies that the storage status of the rewritable non-volatile memory module is the predetermined status, and if the number of the physical erase units belonging to the spare physical erase unit is smaller than the second threshold value, the memory management circuit identifies that the storage status of the rewritable non-volatile memory module is not the predetermined status, wherein if the average number of the erasing operations performed on the physical erase units is greater than the third threshold value, the memory management circuit determines whether the number of the physical program units storing valid data is smaller than a first threshold value, if the number of the physical program units storing the valid data is smaller than the first threshold value, the memory management circuit identifies that the storage status of the rewritable non-volatile memory module is the predetermined status, and if the number of the physical program units storing the valid data is not smaller than the first threshold value, the memory management circuit identifies that the storage status of the rewritable non-volatile memory module is not the predetermined status.

13. The memory controller as recited in claim 8, wherein the physical program units of each of the physical erase units further comprise a plurality of middle physical program unit, the speed of writing data into the lower physical program units is greater than a speed of writing the data into the middle physical program units, and the speed of writing data into the middle physical program units is greater than the speed of writing the data into the upper physical program units, wherein in the second writing mode the lower physical program units, the middle physical program units, and the upper physical program units of the first physical erase unit are applied for writing data.

14. The memory controller as recited in claim 10, wherein the first threshold value is a product of the number of the physical program units of all of the physical erase units and a predetermined ratio.

15. A memory storage apparatus comprising:
a connector configured to couple to a host system;
a rewritable non-volatile memory module comprising a plurality of physical erase units, each of the physical erase units having a plurality of physical program units, the physical program units comprising a plurality of lower physical program units and a plurality of upper physical program units, a speed of writing data into the lower physical program units is greater than a speed of writing data into the upper physical program units; and
a memory controller coupled to the connector and the rewritable non-volatile memory module,
wherein the memory controller is configured to configure a plurality of logical addresses and receive a page data from the host system, and the page data is stored in a first logical address of the logical addresses according to an instruction of the host system,
wherein the memory controller is further configured to select a first physical erase unit from the physical erase units, and the first physical erase unit belongs to a spare physical erase unit,
wherein the memory controller is further configured to determine whether a storage status of the rewritable non-volatile memory module is a predetermined status,
wherein if the storage status of the rewritable non-volatile memory module is the predetermined status, the memory controller is further configured to use a first writing mode to write the page data into a first physical program unit of the physical program units in the first physical erase unit and map the first logical address to the first physical program unit,
wherein in the first writing mode the lower physical program units of the first physical erase unit are applied for writing data, and the upper physical program units of the first physical erase unit are not applied for writing data,
wherein if the storage status of the rewritable non-volatile memory module is not the predetermined status, the memory controller is further configured to use a second writing mode to write the page data into a second physical program unit of the physical program units in the first physical erase unit and map the first logical address to the second physical program unit,
wherein in the second writing mode the lower physical program units and the upper physical program units of the first physical erase unit are applied for writing data.

16. The memory storage apparatus as recited in claim 15, wherein the spare physical erase unit comprises a physical erase unit of the physical erase units in which no data is stored or a physical erase unit of the physical erase units in which invalid data is stored.

17. The memory storage apparatus as recited in claim 15, wherein the memory controller determines whether the number of the physical program units storing valid data is smaller than a first threshold value,
if the number of the physical program units storing the valid data is smaller than the first threshold value, the memory controller identifies that the storage status of the rewritable non-volatile memory module is the predetermined status,
if the number of the physical program units storing the valid data is not smaller than the first threshold value, the memory controller identifies that the storage status of the rewritable non-volatile memory module is not the predetermined status.

18. The memory storage apparatus as recited in claim 15, wherein the memory controller determines whether the number of the physical program units belonging to the spare physical erase unit is smaller than a second threshold value,
if the number of the physical erase units belonging to the spare physical erase unit is not smaller than the second threshold value, the memory controller identifies that the storage status of the rewritable non-volatile memory module is the predetermined status,
if the number of the physical erase units belonging to the spare physical erase unit is smaller than the second threshold value, the memory controller identifies that the storage status of the rewritable non-volatile memory module is not the predetermined status.

19. The memory storage apparatus as recited in claim 15, wherein the memory controller determines whether the average number of erasing operations performed on the physical erase units is greater than a third threshold value,
if the average number of the erasing operations performed on the physical erase units is not greater than the third threshold value, the memory controller determines whether the number of the physical erase units belonging to the spare physical erase unit is smaller than a second threshold value, if the number of the physical erase units belonging to the spare physical erase unit is not smaller than the second threshold value, the memory controller identifies that the storage status of the rewritable non-volatile memory module is the predetermined status, and if the number of the physical erase units belonging to the spare physical erase unit is smaller than the second threshold value, the memory controller identifies that the storage status of the rewritable non-volatile memory module is not the predetermined status,
if the average number of the erasing operations performed on the physical erase units is greater than the third threshold value, the memory controller determines whether the number of the physical program units storing valid data is smaller than a first threshold value, if the number of the physical program units storing the valid data is smaller than the first threshold value, the memory controller identifies that the storage status of the rewritable non-volatile memory module is the predetermined status, and if the number of the physical program units storing the valid data is not smaller than the first threshold value, the memory controller identifies that the storage status of the rewritable non-volatile memory module is not the predetermined status.

20. The memory storage apparatus as recited in claim 15, wherein the physical program units of each of the physical erase units further comprise a plurality of middle physical program unit, the speed of writing data into the lower physical program units is greater than a speed of writing the data into the middle physical program units, and the speed of writing data into the middle physical program units is greater than the speed of writing the data into the upper physical program units,
wherein in the second writing mode the lower physical program units, the middle physical program units, and the upper physical program units of the first physical erase unit are applied for writing data.

21. The memory storage apparatus as recited in claim 17, wherein the first threshold value is a product of the number of the physical program units of all of the physical erase units and a predetermined ratio.

* * * * *